(12) United States Patent
Liu

(10) Patent No.: US 8,698,063 B2
(45) Date of Patent: Apr. 15, 2014

(54) READOUT CIRCUIT HAVING ENHANCED DYNAMIC RANGE

(75) Inventor: Tina Y. Liu, Santa Barbara, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 341 days.

(21) Appl. No.: 13/315,961

(22) Filed: Dec. 9, 2011

(65) Prior Publication Data

US 2012/0145883 A1    Jun. 14, 2012

Related U.S. Application Data

(60) Provisional application No. 61/421,443, filed on Dec. 9, 2010.

(51) Int. Cl.
*H01L 27/00* (2006.01)
*H04N 3/14* (2006.01)

(52) U.S. Cl.
USPC .......................................... 250/208.1; 348/308

(58) Field of Classification Search
USPC .......................................... 250/208.1; 348/308
See application file for complete search history.

(56) References Cited

U.S. PATENT DOCUMENTS

| 5,204,519 A | 4/1993 | Nishihara et al. |
| 6,369,737 B1 * | 4/2002 | Yang et al. .................. 341/155 |
| 6,873,359 B1 | 3/2005 | Kozlowski et al. |
| 7,298,406 B2 | 11/2007 | Borg |
| 7,733,382 B2 * | 6/2010 | Takayanagi ................ 348/223.1 |
| 2006/0170491 A1 * | 8/2006 | Wany et al. ................... 330/4.9 |

* cited by examiner

*Primary Examiner* — Thanh Luu

(74) *Attorney, Agent, or Firm* — Beusse Wolter Sanks Mora & Maire, P.A.

(57) ABSTRACT

A method of reading out photocurrent. A readout integrate circuit (ROIC) is provided including an integration capacitor (Cint) having a charging electrode. The ROIC provides linear operation over a linear pixel output signal range when a voltage across Cint ($V_{int}$) is in a $V_{int}$ range between $V_{lin1-cap}$ and $V_{lin2-cap}$, and a non-linear operation range outside the Vint range. A reset voltage (Vrst) is applied to the charging electrode to reset $V_{int}$ outside the $V_{int}$ range. The photocurrent is integrated to generate integrated photocurrent during a frame including integrating from Vrst toward the $V_{int}$ range to integrate background current into the non-linear operation range and integrating to a voltage within the $V_{int}$ range to integrate scene current into the linear pixel output signal range. The integrated photocurrent is processed to generate a pixel output signal. The pixel output signal excludes some background current that was integrated into the non-linear operation range.

20 Claims, 7 Drawing Sheets

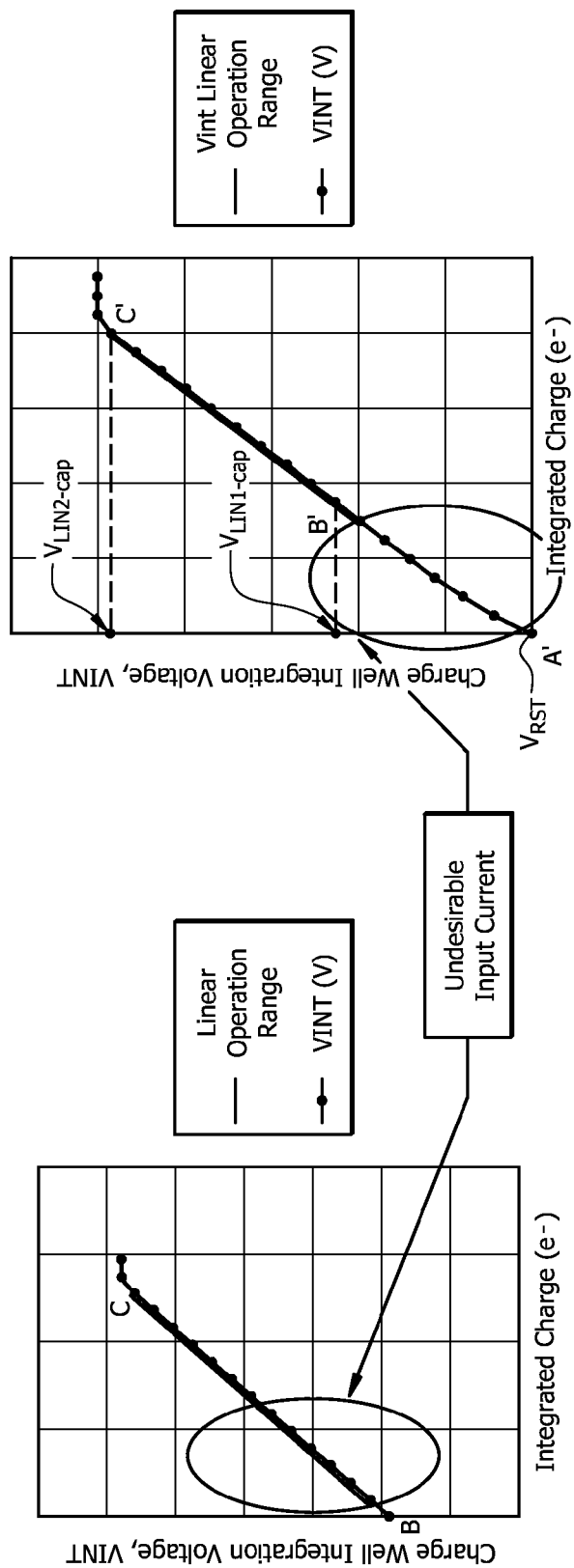

READOUT CIRCUIT HAVING ENHANCED DYNAMIC RANGE

CROSS REFERENCE TO RELATED APPLICATIONS

This application claims the benefit of Provisional Application Ser. No. 61/421,443 entitled "READOUT IC HAVING ENHANCED DYNAMIC RANGE BY INTEGRATING UNDESIRED INPUT CURRENT IN NON-LINEAR READOUT RANGE" filed Dec. 9, 2010, which is herein incorporated by reference in its entirety.

FIELD

Disclosed embodiments relate to methods of reading out photocurrent and readout integrated circuits (ROICs) for reading out photocurrent, and imaging systems therefrom.

BACKGROUND

Infrared imaging systems may be used to detect infrared radiation. Such imaging systems can create an image of a scene of interest by capturing and processing infrared radiation emitted from the scene. Photodetectors provide electrical photocurrent signals responsive to radiation received from the scene, and the photocurrent is processed by ROICs.

For example, an infrared imaging system may be used as a night vision apparatus to display an image of a scene of interest at night by capturing infrared radiation emitted from the scene. A challenge for such systems is imposed because the output signal from the photodetector array comprising a plurality of pixels includes the wanted signal comprising the fine detail of the scene under surveillance resulting from flux from the scene of interest, superimposed upon an undesired (non-scene) "background" signal resulting from background flux. The background signal from background flux as used herein refers all signal contributions other than flux from the scene of interest, such as thermal flux from the lower temperature scene, flux from the lens, dewar or warm/cold-shield (if included), and leakage current from the electronics (e.g. transistors) in the photodetector array and the ROIC. The presence of unwanted background signals imposes constraints and limitations on the design and performance of any ROIC. A large fraction of the available charge storage capacity may be used to store/integrate charge associated with the background signal, leaving less capacity for the wanted signal associated with the scene and adding noise, thus degrading performance of the ROIC.

Conventional ROICs include integration capacitors for integrating the photocurrent received from photodetector pixels in the photodetector array, such as a typical enhancement mode n-channel metal oxide semiconductor field effect transistor (MOSFET) configured as an integration capacitor (Cint). Such n-channel MOSFETs generally have a threshold voltage (Vt) of about 0.5 V to 0.9V. n-channel MOSFETs in Nwells generally have a Vt of about 0.1V~0.4V.

As known in the art, a MOSFET is capacitor-connected when its drain and source are shorted together to form one plate of the capacitor, and the gate provides the other plate of a capacitor, with one of these plates connected to an integration node in the ROIC with the other plate node coupled to a reference-node (e.g., such as grounded or hooked to some other fixed potential). Below Vt Cint will have a highly non-linear charge well integration voltage (Vint) vs. integrated charge (e−) relation, while this relation will be substantially linear above Vt until saturation is reached. For conventional ROICs, following a read of each pixel, Vint of the Cint is reset by applying a suitable reset voltage (Vrst) before initiating the next frame. Vrst will be at least Vt, such as about 1 V when Vt is 0.5V to 0.9V, which ensures Cint is always operated in its linear range during the entire charge integration process.

Vrst is sometimes chosen to maintain the linearity of unit cell amplifier's output signal during the charge integration process. A source follower configuration with a Vt of 0.5V~1V (depending on process and N or P type MOSFET) is often chosen as a unit cell output amplifier. Therefore, a Vrst of 1V for example, may be selected to be greater than the Vt of 0.5V to 0.9V even when Cint is linear for Vint>0.3V (up to around 3V, for example).

Known approaches for increasing charge well capacity to brighten the scene signal include current skimming, multiple capture, and logarithmic sensor approaches. Such known approaches generally add complexity to the implementation, and can suffer performance problems including significant non-uniformity of fixed pattern noise (FPN) among the pixels or segmented images.

SUMMARY

Disclosed embodiments include Readout integrated circuits (ROICs), imagers therefrom, and methods of reading out photocurrent that provide enhanced dynamic range which eliminate or at least substantially reduce undesirable background current that would otherwise take up a significant portion of linear operation range of the ROIC. The ROIC includes an integration capacitor (Cint) having a charging electrode. The ROIC provides linear operation over a linear pixel output signal range when a voltage across Cint ($V_{int}$) is in a $V_{int}$ range between $V_{lin1-cap}$ and $V_{lin2-cap}$, and a non-linear operation range outside the Vint range. A reset voltage (Vrst) outside the $V_{int}$ range is applied to the charging electrode to reset $V_{int}$ to a voltage that is outside the $V_{int}$ range.

The photocurrent is integrated to generate integrated photocurrent during a frame including integrating from Vrst toward the $V_{int}$ range to integrate background current into the non-linear operation range, and continuing the integrating to a voltage within the $V_{int}$ range to integrate scene current (and any background current not integrated into the non-linear operation range) into the linear pixel output signal range. The integrated photocurrent is processed to generate a pixel output signal. The pixel output signal thus excludes some background current that was integrated into the non-linear operation range.

Disclosed embodiments apply to both P-on-N photodetectors and N-on-P detectors. For P-on-N photodetectors the photocurrent flows into the unit cell so that during charge integration Vint will integrate up (increasingly positive) in voltage, while for N-on-P detectors the photocurrent flows out of unit cell, so that during charge integration Vint will integrate down (increasingly negative) in voltage.

The pixel output signal provided by disclosed ROICs thus excludes at least some of the portion of the background flux that is integrated, such as up to one-third to one-half of the unit cell linear charge well capacity. It is noted that the amount of background flux depends on the wavelength band of the application. For example, in typical Long Wave Infrared (LWIR) applications (e.g., 8 to 12 µm) the background flux can be much larger than a typical unit cell can fully integrate. In this case the "extra" background current not able to be integrated into the non-linear operation range due to excess background flux is integrated into the linear pixel output signal range of the ROIC.

As defined herein "linear operation of the ROIC" is defined as a continuous pixel output signal range of at least 0.15 V where the transfer function of the ROIC (pixel output signal voltage/integrated charge received from the photodetector) follows a least squares derived line with a maximum deviation of +−1% of (Vlin,max−Vlin,min) from the line. For example, for a continuous pixel output signal range of 0.5 V, the maximum deviation would be ±5 mV. Also, as used herein the "non-linear operation range" is defined as a voltage range outside (above and below) the linear operation of the ROIC. In the case of P-on-N photodiodes, the non-linear operation range utilized would be at a voltage level below the ROIC's linear operation range while for N-on-P photodiodes the ROIC's non-linear operation range utilized would be at a voltage level above the linear operation range.

BRIEF DESCRIPTION OF THE DRAWINGS

FIGS. 1A and 1B depict the transfer function for $C_{int}$ comprising Vint across Cint for a capacitor-connected metal oxide semiconductor field effect transistor (MOSFET) vs. integrated charge (e−) using a traditional approach and an approach based on a disclosed embodiment, respectively.

DETAILED DESCRIPTION

Figure 1D:
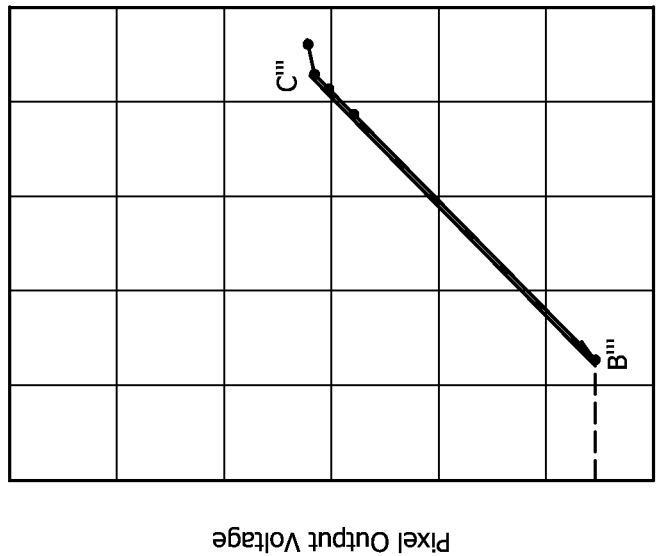
FIGS. 1C and 1D depict the linear operation range of the transfer function for an ROIC comprising the pixel output voltage vs. integrated charge (e−) using a traditional approach and an approach based on a disclosed embodiment, respectively.

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration.

It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 1.

Disclosed embodiments include 2-dimensional (2D) ROICs and imagers therefrom having enhanced dynamic range. Disclosed embodiments also include methods for reading out photocurrent received from a photodetector arrays by integrating at least a portion of the undesired input current associated with the background flux into the non-linear range of the ROIC for use in imaging applications.

As known in the art the ROIC's non-linear range is for pixel output voltages above and below its linear operation range. As defined above, the ROIC's non-linear range refers to the pixel output voltage range(s) corresponding to >±1% non-linearity. The non-linear range can include an unreadable sub-range which refers to the range of pixel output voltages when the amplifier is saturated and the pixel output voltage does not measurably change even when the integrated charge input is decreasing below the low end of the linear range, or the pixel output voltage does not measurably increase when the integrated charge input is increasing above the high end of the linear range.

FIGS. 1A and 1B depict the transfer function for $C_{int}$ comprising Vint across $C_{int}$ for a capacitor-connected MOSFET vs. integrated charge (e−) using a traditional approach and an approach based on a disclosed embodiment, respectively. As described below, the transfer function for $C_{int}$ is a component of the transfer function for the ROIC, and in the case of a MOSFET based $C_{int}$, the transfer function for $C_{int}$ is a primary component of the transfer function for the ROIC. FIGS. 1A and 1B and other FIGs herein are shown for P-on-N photodetector embodiments, which as noted above have the photocurrent flowing into the unit cell so that during charge integration Vint will integrate up (increasingly positive) in voltage. However, disclosed embodiments also include N-on-P detectors that have the photocurrent flowing out of unit cell, so that during charge integration Vint will integrate down (increasingly negative) in voltage.

Two operation ranges can be seen in FIG. 1A to be utilized during charge integration, that being that being a linear operation range from point B to point C, with a saturation range beyond point C. Operating point B represents the starting point of the charge integration that is set by application of the reset voltage (Vrst) utilized in each frame to $C_{int}$, and the initial Vint for each frame can be seen to be well above 0 volts, such as at a typical value of at least Vt for the capacitor-connected MOSFET, for example at about 1 V when Vt is 0.5V to 0.9V.

Disclosed embodiments recognize using the traditional approach shown in FIG. 1A results in undesirable background current taking up a significant portion of the ROIC's linear operation range, with interested scene photocurrent taking the remaining portion of the linear operation range. As noted above, undesirable input current includes, but is not limited to, lower temperature scene photocurrent, photo current from dewar warm/cold-shield, background photo current, detector leakage from the photodetector array and MOSFET leakage current from devices in the ROIC, such as detector bias-control circuits, capacitor-connected MOSFET capacitors, reset and sample switches, and unit cell amplifiers.

In contrast, disclosed embodiments reflected in FIG. 1B show the current associated with the interested scene utilizing substantially all the linear operating range of Cint by making use of the nonlinear range of Cint for the undesirable (background) input current. Three operation ranges can be seen to be in FIG. 1B, including a non-linear operation range from point A' to point B', a linear operation range from point B' to point C', with a saturation range beyond point C'. Operating point A' represents the starting point of the charge integration that is set by the Vrst utilized to reset $C_{int}$, and the initial Vint value can be seen to be about 0 volts, so that the initial Vint.value is set below the lower edge of the linear Vint range shown as $V_{lin1-cap}$ for the capacitor-connected MOSFET, such as about 0 (ground) to 0.95 V when $V_{lin1-cap}$ is 1V. The upper edge of the linear Vint range is shown as $V_{lin2-cap}$, such as at about 2.2 to 3.3 V for a 3.3 V power supply. Disclosed embodiments utilize both the non-linear operation range from point A' to point B' (for integrating undesired background current) and the linear operation range from point B' to point C' for integrating scene current during charge integration operations.

Although FIGS. 1A and 1B depict the transfer function for Cint, since the downstream circuitry in the ROIC can also contribute to the value of the non-linear operating range of the ROIC, the low end of Vint linear range can be chosen based upon the minimum linear voltage that would remain linear throughout the ROIC signal chain. The high end of Vint linear range can be also chosen based upon the maximum linear voltage that would remain linear throughout the ROIC signal chain. For embodiments where Cint comprises a capacitor-connected MOSFET and a pixel output amplifier is present, the transfer function for Cint will generally be a primary component of the transfer function for the ROIC. A voltage shift (ΔV) that is typically from 0 v (no shift) to ±1.2 v, typically ±0.2 v to +−1.0 v, corresponds to the voltage shift in the pixel output signal of the ROIC signal relative to Vint that is caused by the downstream processing circuitry that processes Vint. For example, when N source follower is used, the output of source follower is generally shifted lower, and when P source follower, the output of source follower is generally shifted higher.

Figure 1C:
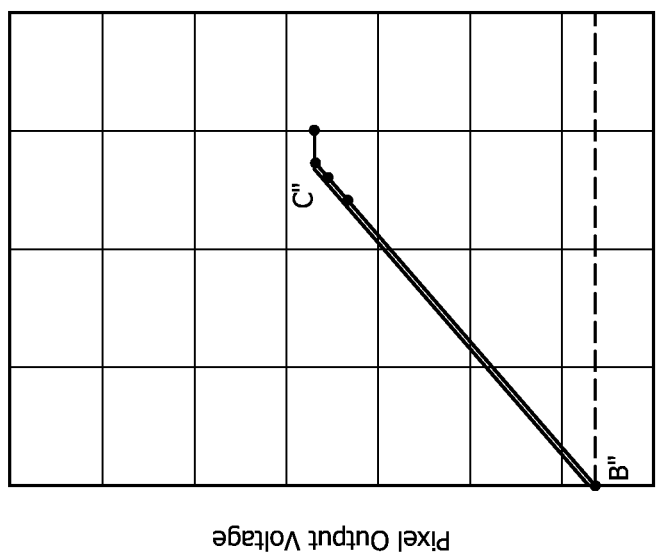

FIGS. 1C and 1D depict the linear operation range of the transfer function for an ROIC comprising the pixel output voltage vs. integrated charge (e–) using a traditional approach and an approach based on a disclosed embodiment, respectively. In FIG. 1C labeled prior art, the range from B" to C'" represents the linear operation range of the transfer function for the ROIC, with the saturation range beyond point C". The linear operation range of the transfer function for the ROIC can be seen to begin at zero integrated charge (B").

FIG. 1D depicts the transfer function for an ROIC comprising pixel output voltage vs. integrated charge (e–) using an approach based on a disclosed embodiment. The range from B'" to C'" represents the linear operation range of the transfer function for the ROIC. The linear operation range of the transfer function for the ROIC can be seen to begin at a non-zero integrated charge (B'") by using a Vrst value below the Vint linear range shown in FIG. 1B as disclosed above so that in imaging operations although charge integration takes place in the pixel output range below B'", the charge integrated below B'" would not be read out since background photo current would fill the Cint to the point B'". The maximum voltage to be read out is the saturated value (somewhat above C'"). Above C'" the charge integrated would not be read out, or is at least substantially attenuated compared to charge integrated in the linear operation range of ROIC.

Figure 2:
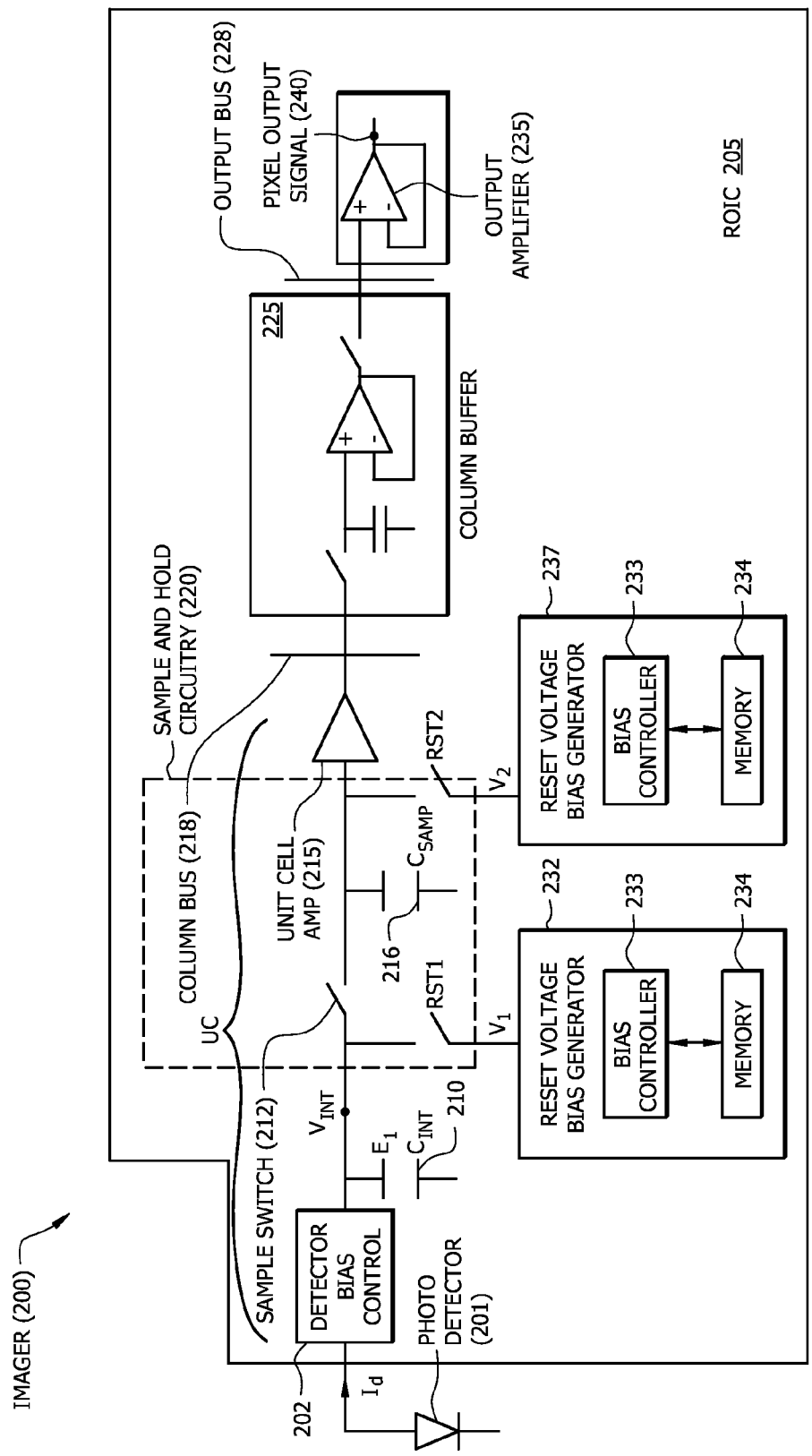
FIG. 2 is block diagram of an example imager including an ROIC having enhanced dynamic range, according to a disclosed embodiment.

FIG. 2 is block diagram of an example imager 200 including an ROIC 205 having enhanced dynamic range according to a disclosed embodiment, coupled to a photodetector 201. The term unit "cell/pixel" for disclosed ROICs and imagers refers to the circuitry that receives the photocurrent up to and including the circuitry that interfaces to the column bus. It is noted that although a single unit cell/pixel, column buffer and output amplifier is shown for imager 200 and other imagers shown in the FIGs. below, it is understood that imagers comprise a plurality of unit cells (typically a very large number) so that photodetector 201 is a photodetector array, and there are a plurality of instances of column buffers, output amplifiers and peripheral supporting circuitry.

The photodetector 201 provides photocurrent Id, and is controlled by optional detector bias control block 202. Cint 210 has a charging electrode $E_1$ switchably coupled to photocurrent processing circuitry comprising Cint 210, optional sample and hold circuitry 220, a unit cell amplifier 215, column buffer 225 and output amplifier 235.

Imager 200 in one embodiment comprises a monolithic IC that includes the photodetectors 201 and ROIC 205 on the same chip. The unit cell/pixel portion of ROIC 205 includes all the circuitry from detector bias control 202 up to an including the unit cell amplifier 215.

Sample and hold circuitry 220 is shown comprising a sample switch 212, sampling capacitor (Csamp) 216, and a first reset switch RST1 and a second reset switch RST2. The first reset switch RST1 is controlled by a bias shown as V1 and the second reset switch RST2 is controlled by a bias shown as V2. Cint 210 and Csamp 216 can be tied to ground or to a DC power level. Reset voltage bias generator 232 provides V1 while reset voltage bias generator 237 provides V2. However, in a practical implementation of disclosed embodiments, only a single adjustable reset bias voltage generator is generally used while the other reset bias voltage generator may be at a DC level or ground.

An adjustable reset bias provides certain advantages compared to a fixed bias. For example, an adjustable reset bias can be used to compensate when Cin comprises a MOSFET and the Vth in FET model for Cin 210 or the background flux calculation is inaccurate. The adjustable reset bias level(s) can be set by a test engineer.

Reset voltage bias generators 232 and 237 are shown comprising adjustable bias generators. On-chip memory 234 can be used for storing a few bits to select different V1 and V2 values from the bias generators. Test software (algorithms) may be utilized if setting bias levels automatically is desired, such as by periodically generating the transfer function for the ROIC to determine where the ROIC provides linear operation over a linear pixel output signal range when $V_{int}$ is in a $V_{int}$ range between a first voltage $V_{lin1-cap}$ and a second voltage $V_{lin2-cap}$.

The unit cell amplifier 215 coupled to Vint by sample switch 212. Unit cell amplifier 215 is coupled by a column bus 218 to a column buffer 225. Column buffer 225 is coupled by an output bus 228 to an output amplifier 235 which provides a pixel output signal 240.

Cint 210 can comprise a MOSFET-based integration capacitor, or other capacitor types including conventional parallel plate capacitors. In operation the photodetector input current $I_d$ generated by photodetector 201 responsive to flux received from the background and the scene to be imaged is converted into a voltage, $V_{INT}$, as it is integrated across Cint 210.

There are several ways to apply a suitable Vrst for resetting Cint 210 to a Vint value that is outside the Vint range that corresponds to the ROIC's linear operation range before integrating each frame for ROIC 205. One example way is to have an adjustable V1. Another way is to have an adjustable V2. Since Cint 210 and Csamp 216 have charge-sharing when the sample switch 212 turns on, varying V2 has the same effect as varying V1. Another way to apply Vrst for ROIC 205 is to change the ratio of Csamp/Cint. Again, with charge sharing effect, a different ratio of Csamp/Cint causes a different effective Vrst value. Another example way is a combination of the above described approaches. The effective Vrst, due to charge sharing, is represented the equation below (where Csamp represents the sampling capacitor):

$$V_{rst} = \frac{\int_0^{V_1} C_{int}(v) d\Box dV + \int_0^{V_2} C_{samp}(v) dV}{C_{int}/V = V_{rst} + C_{samp}/V = V_{rst}}$$

In the case of the ROICs described below for FIG. 3, FIG. 4 and FIG. 5, applying Vrst is accomplished by having an single reset voltage bias generator that provides an adjustable V1 that is selected to reset the charging electrode E1 to a value that is outside the Vint range that corresponds to the ROIC's linear operation range. The lower end of linear operating range of ROIC 205 may be set in part by the photocurrent processing circuitry comprising unit cell amplifier 215, Cint 210, amplifiers in column buffer 225, output amplifier 235 or an analog to digital converter ADC, such as ADC 510 shown in FIGS. 5-7.

Cint 210 embodied as a capacitor-connected MOS-based integration capacitor can comprise an enhancement-mode n-channel MOSFET in a p-well or p-substrate, an enhancement-mode p-channel MOSFET in an n-well, an n-channel MOSFET in-a-nwell, a p-channel MOSFET-in-a-pwell, a depletion-mode MOSFET a native MOSFET, a conventional parallel plate capacitor, or a combination of the above. A native MOSFET is formed without a threshold adjust implant. The downstream circuits in photocurrent processing circuitry, such as the amplifiers in column buffers 225 or amplifiers in output amplifier 235, or an ADC (if included) can limit the linear range the same way as the unit cell amplifier 215 can.

In operation of ROIC 205 a reset voltage bias generator such as reset voltage bias generator 232 couples an adjustable voltage shown as V1 through RST1 to the charging electrode E1 of Cint 210 for resetting Cint 210 to a Vint value that is outside the Vint range that corresponds to the ROIC's linear operation range before integrating each frame. As disclosed herein, by applying a Vrst to the charging electrode E1 of Cint 210 to reset Cint 210 to a Vint value that is outside the Vint range that corresponds to the ROIC's linear operation range before beginning integration in each frame before integrating charge in each frame more fully utilizes the ROIC's 205 linear operating range.

The photodetector 201 for disclosed imager such as imager 200 can be on a separate chip, as in the case in most infrared focal plane arrays (FPAs). Such infrared FPAs include a detector array that provides the photodetector pixels such as the photodetector 201 shown in FIG. 2, and an ROIC that includes the other circuitry shown in FIG. 2. As noted above, for visible imagers, the photodetector 201 can be part of the imager chip since silicon-based diodes can be used to detect visible light.

Typical ROICs are operated in a video mode, which means it takes images frame after frame with minimum dead time between frames. However, reading out a full array of photodetector pixels takes a full frame time, too. Therefore, at the end of integration for each frame of image, the integrated signal (Vint) is sampled into a Csamp. This way, Cint 210 can integrate the next frame of image while the whole array of pixels may be read out sequentially.

Regarding the RST2 switch, Csamp 216 retains the signal value from the previous frame. Before sampling a new integrated signal, reset of the previous value is needed to avoid mixing of the two frames because of charge sharing.

Disclosed ROICs include a variety of other ROIC arrangements. For example, there can be an amplifier immediately before the sample switch 212 and no RST2 switch. In some other circuit designs, there may not be a unit cell amplifier 215 driving the column bus 218. Instead, the signal may be digitized by an analog to digital converter (ADC) provided by the ROIC or on a separate chip. In some other designs, there may not be a sampling operation (so no sample switch 212 and Csamp 216), where a progressive scan or ripple mode may be used instead. Some of these embodiments are shown in FIGS. 3-9 described below. In all of these variant ROIC designs, disclosed application of Vres to the charging electrode $E_1$ of Cint to obtain a Vint value that is outside the Vint range that corresponds to the ROIC's linear operation range before integrating each frame for the ROIC so that at least some of the background flux is integrated into the non-linear operating range of the ROIC range remains applicable.

Disclosed embodiments include a method of reading out photocurrent using a ROIC including aCint having a charging electrode and photocurrent processing circuitry. The ROIC provides linear operation over a linear pixel output signal range when a voltage across Cint ($V_{int}$) is in a $V_{int}$ range between $V_{lin1\text{-}cap}$ and $V_{lin2\text{-}cap}$, and a non-linear operation range outside the Vint range. A reset voltage (Vrst) is applied to the charging electrode to reset $V_{int}$ outside the $V_{int}$ range. The photocurrent is integrated to generate integrated photocurrent during a frame including integrating from $V_{rst}$ toward the $V_{int}$ range to integrate background current into the non-linear operation range and integrating to a voltage within the $V_{int}$ range to integrate scene current and some of the remaining background current if there is any into the linear pixel output signal range. The integrated photocurrent is processed to generate a pixel output signal. The pixel output signal excludes some background current that was integrated into the non-linear operation range.

The method can further comprise measuring or simulating a transfer function for the ROIC that relates the pixel output signal voltage to integrated charge received from the photodetector, and obtaining at least one of the first voltage and second voltage that define the Vint range from the transfer function that can be used to set Vrst. In one embodiment Vrst comprises ground or near ground (e.g., 0 to 0.5 V) for the ROIC when coupled to P-on-N photodetectors or near the power supply rail (2.5 to 3.3V for a 3.3 V power supply) for the N-on-P photodetector case.

In one embodiment determining Vrst can comprise identifying the amount of background flux present based on the system specifications. Background flux can be converted to total background charge (Qb). With either a MOSFET model provided by the foundry for the ROIC or C-V curve acquired through testing or simulation, a suitable Vrst value may be determined. A relation between the background charge Qb and Vrst is defined below:

$$Q_b = \int_{V_{rst}}^{V_{LIN}} C(v) dV.$$

where Vrst is the reset voltage and $V_{lin}$ is the lower end of linear operating range of the ROIC. In the case Qb is larger than the charge capacity of the non-linear range, Vrst may be set to 0 V for P-on-N photodetector embodiments. The portion of Qb exceeding the charge capacity of the non-linear range, along with the scene photo charge, will be integrated in the linear range.

The signal processing provided by disclosed photocurrent processing circuitry can further comprises digitizing using an ADC so that the pixel output signal is a digital pixel signal comprising a plurality of bits that have a corresponding count. In this embodiment, a zero count can be set to correspond to a background flux level associated with the background current. For example, assume a P-on-N photodetector and $V_{lin1-cap}$ is 1V. Instead of having zero flux at 1V by using a conventional Vrst of 1V, such as shown in FIG. 1A, disclosed embodiments may reset (Vrst) at around 0 V (ground) to have the background flux utilize the nonlinear portion of the transfer function of the ROIC (e.g., 0 V to about 1V). Thus, for disclosed embodiments, by using a Vrst below $V_{lin1-cap}$, depending on how much background charge the application has, such as by at least 0.1 volts, the background flux level is integrated below the linear range of the ROIC.

In a specific numerical example, assume the ROIC has a 12 bit digital output from 0 count to 4096 count, and within the integration time the photodetector pixel outputs a photocurrent totaling 3 million electrons, with 1 million electrons being from the background flux, and 2 million electrons from the scene flux. Using a disclosed embodiment, 0 count can correspond to 1 million electrons and the 4096 count would correspond to all 3 million electrons. In traditional approach, in contrast, 0 count is 0 electrons, and the most that can be integrated is 2 million electrons, so that 2 million electrons (from the background flux and the scene flux) correspond to 4096 count.

For digital embodiments, the photocurrent processing circuitry includes an ADC. Among available ROIC designs, the ADC can be implemented outside the ROIC (using a separate chip), in the last block before all pixel data is sent out to bonding pad (after all pixels are already sequentially read out), in the column buffer, or in the unit cell. Disclosed embodiments apply to all of these embodiments. Moreover, disclosed embodiments apply to ROIC's that generate either analog outputs or digital outputs.

As noted above, disclosed embodiments include a variety of different arrangements for the photocurrent processing circuitry of the ROIC. For example, FIG. 3 is block diagram of an example imager 300 where the photocurrent processing circuitry includes a sample and hold block 335 comprising a sample amplifier 320 and a sample switch 321 which drives a sample/hold ("sample cap") 325 between Cint 210 and the unit cell amplifier 215. In this embodiment the switch shown as RST2 shown in FIG. 2 is not needed. Column bus 218, column buffer 225, output bus 228 and output amplifier 235 shown in FIG. 2 are not shown for simplicity in FIG. 3 or one or more of these elements in FIGs. described below.

Figure 4:
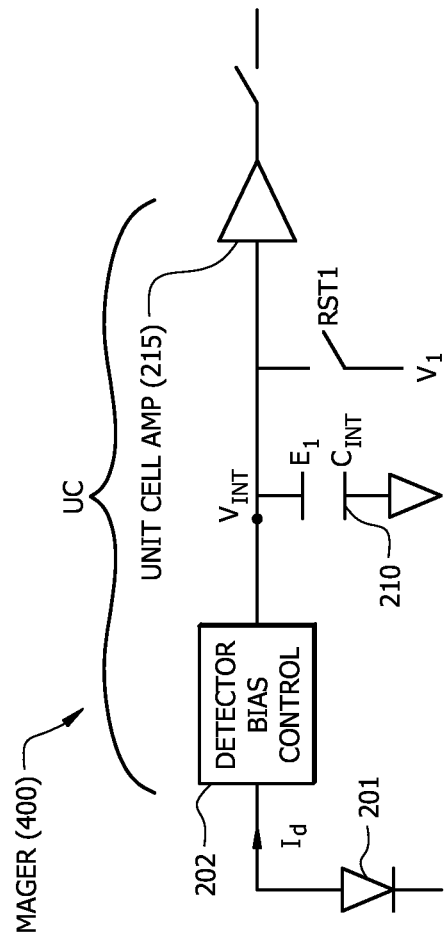

FIG. 4 is block diagram of an imager 400 that excludes a sample and hold/ADC. The ADC may be provided in (1) the photodetector 201 pixels (2) the column buffers 225, or (3) by replacing the output amplifier 235 all shown in FIG. 2. In the photodetector pixel case (1), unit cell amplifier 215 may be replaced by an ADC 510, shown included in the imager 500 shown in FIG. 5. In this arrangement the linear range of the ADC 510 in the unit cell may limit the linear range of integration for the ROIC 500. The column buffer 530 includes ADC 510. The column buffer 530 may resemble a DRAM array/SRAM array, or latches with multiplex switching. The output amplifier 235 may comprise inverters as shown.

Figure 6:
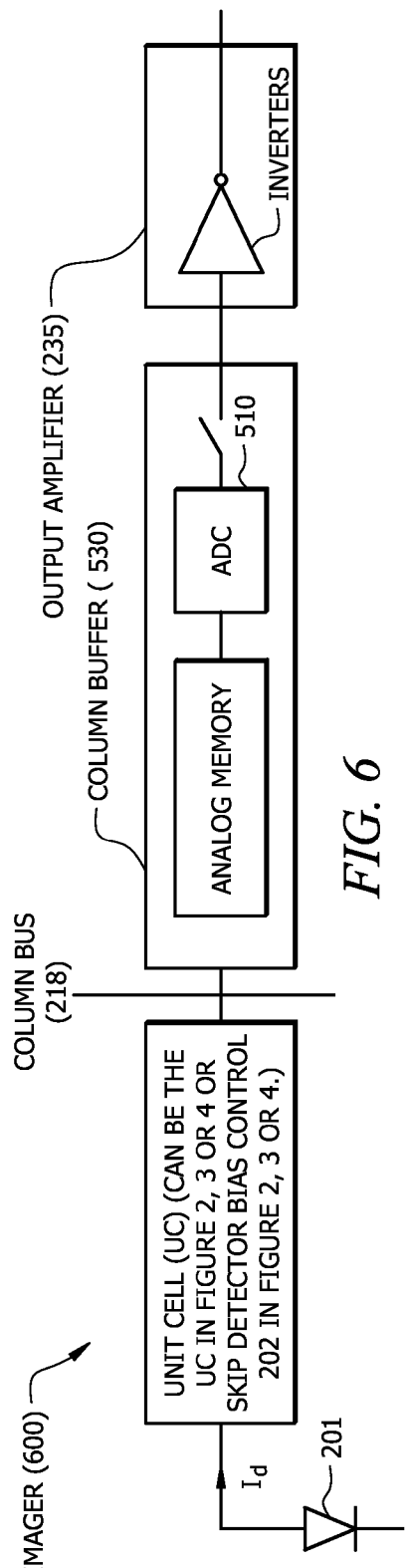
Figure 7:
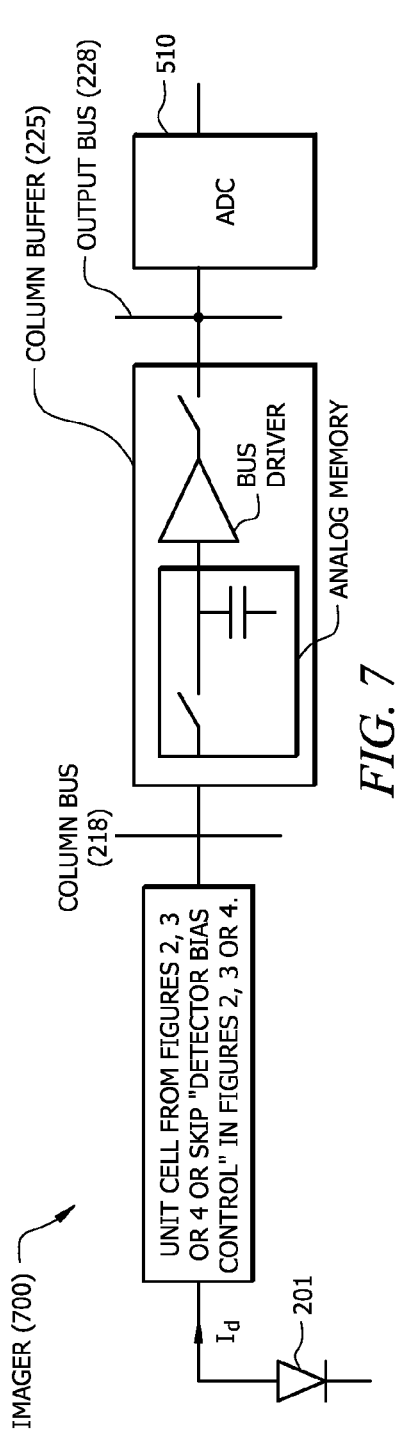

In the column buffer case (2), as shown by the imager 600 in FIG. 6, the column buffers 530 can comprise DRAM array/SRAM array or latches with multiplex switching. The output amplifiers 235 may comprise inverters. In the replacing the output amplifier case (3), the output amplifier can be replaced by ADC 510, as illustrated in imager 700 shown in FIG. 7.

The unit cell output amplifier may be directly connected to a bonding pad (thus no column buffer or output amplifier) when the speed (# of pixels read out/sec) is not an a concern in the design. Thus the unit cell (UC) having a unit cell amplifier can be directly coupled to a bond pad.

Figure 3:
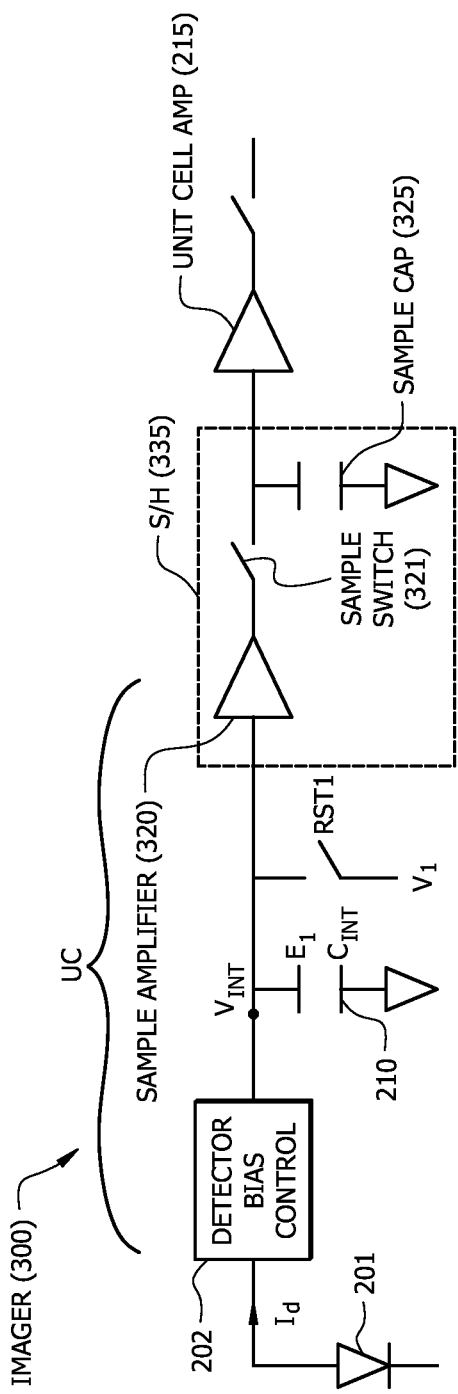
FIGS. 3-7 are block diagrams of imagers including example ROICs having enhanced dynamic range according to various disclosed embodiments.
Figure 8:
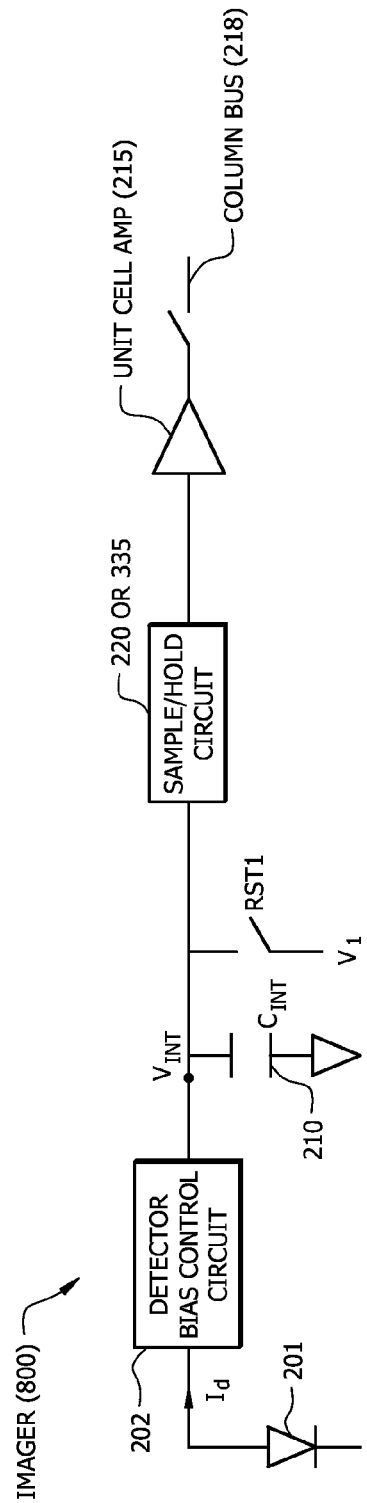
FIG. 8 shows an imager including an ROIC having enhanced dynamic range that can include the sample and hold circuitry shown in FIG. 2 or 3, according to a disclosed embodiment.
Figure 9:
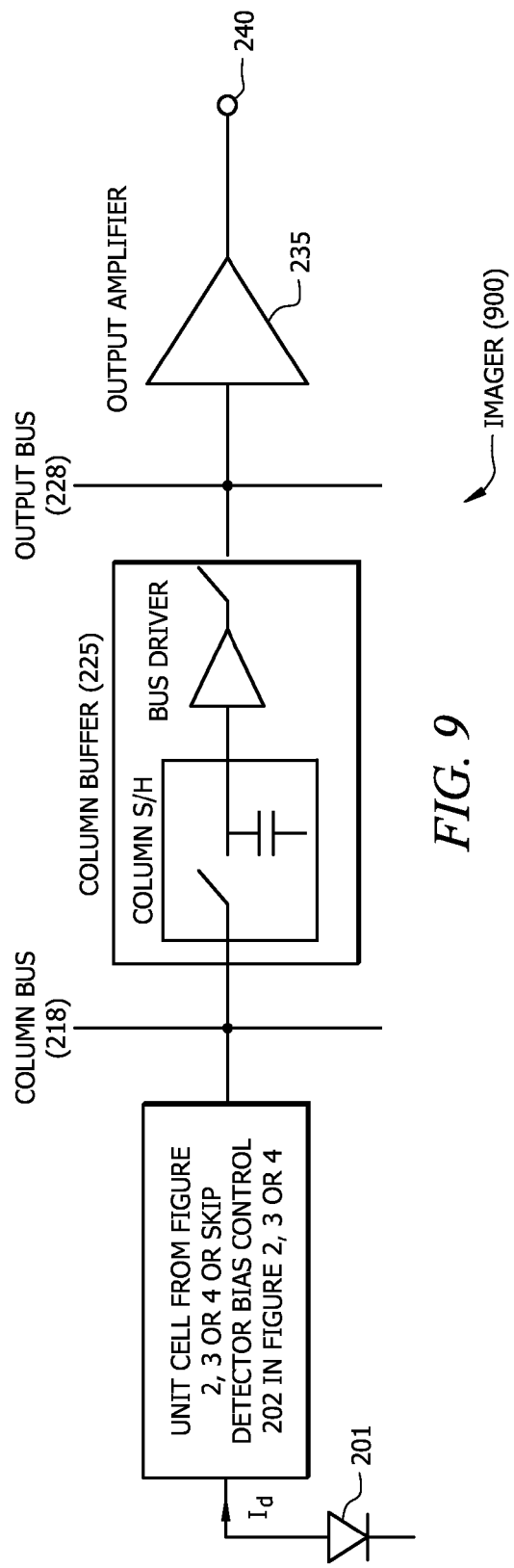
FIG. 9 shows an imager including an ROIC having enhanced dynamic range that provides an analog output, according to a disclosed embodiment.

FIG. 8 shows an imager 800 that can include the sample and hold circuitry shown in FIGS. 2 (220) or FIG. 3 (335). FIG. 9 shows an imager 900 having enhanced dynamic range that provides an analog output (no ADC), according to a disclosed embodiment.

Disclosed embodiments include applications including, but not limited to, long wave infrared (LWIR) and mid-wave infrared (MWIR) that can (1) increase charge well capacity for a given Cint, (2) improve sensitivity by reducing capacitor size (area) for a given charge well, and (3) enhance picture contrast. For example, a signal-to-noise ratio increase of up to 10× or more is possible with zero signal of the ROIC output being set at near zero signal of the interested scene, instead of what undesirable input current fills up since the reciprocal of a number close to zero is much larger. Charge capacity is also increased which increases brightness.

Additional charge capacity in the nonlinear range of ROIC is thus utilized by disclosed embodiments. Therefore, the charge capacity increases for a given integration capacitor without changing the physical pixel size. Enhancing sensitivity can be provided because the size of Cint can be reduced to meet a specified charge capacity. This represents a front-end gain of signal relative to down-stream ROIC read noise. Therefore, sensitivity improves. Spatial noise can be reduced because the signal dynamic-range-of-interest is effectively segregated and amplified beyond what is possible without clipping the lower (unusable) portion off, and a variety of spatial noise components are effectively reduced.

EXAMPLES

Disclosed embodiments are further illustrated by the following specific Examples, which should not be construed as limiting the scope or content of this Disclosure in any way.

Figure 5:
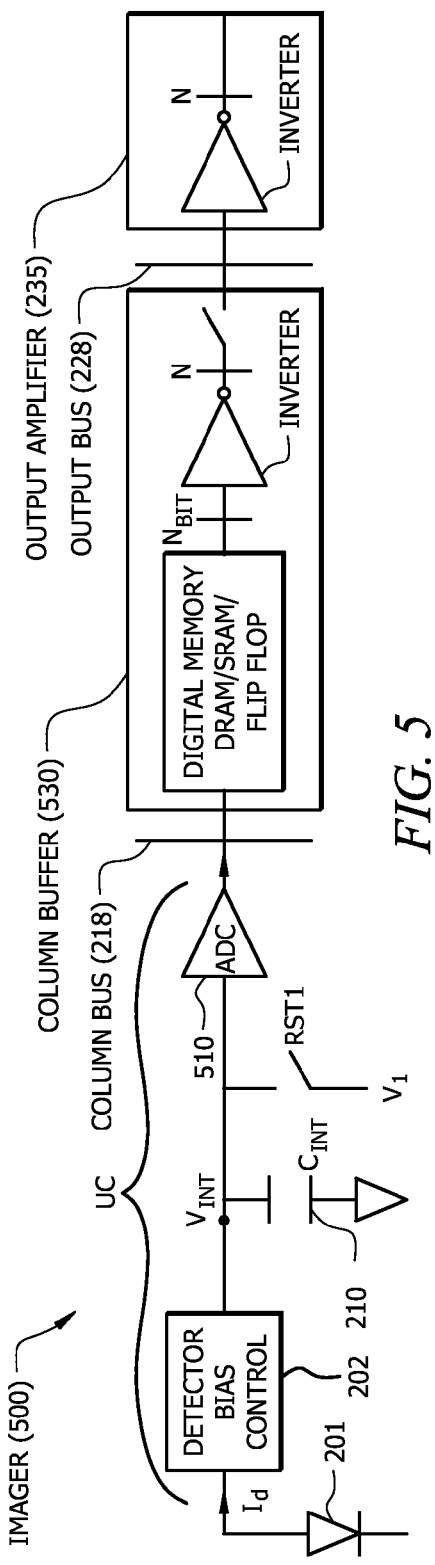

For a 13 bit digital output ROIC embodiment based on P-on-N photodiodes, such as based on the ROIC shown in FIG. 5 provides a linear operation range between a pixel output voltage of 1V and 2.6V, with <1 V being non-linear. By setting V1 to provide a Vrst of 0.3V and by setting (e.g. programming) the ADC's 510 input range to be from 1V to 2.6V, a "pedestal" at 0 count (0 bits) at the output of the ADC 510 is defined so that there is a zero count for background flux through the ROIC swing range of <1 V, such as 0.3V~1V. Since some background flux is generally always present, the desired signal of the scene will be within the voltage range ≥1V (on top of the background "pedestal"; e.g., 1V to 2.6V), so that all 13 bits of the ADC are used for imaging the desired scene, thus significantly enhancing sensitivity.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The terminology used herein is for the purpose of describing particular embodiments only and is not intended to be limiting to this Disclosure. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this Disclosure belongs. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

I claim:

1. A method of reading out photocurrent:
providing a readout integrate circuit (ROIC) comprising an integration capacitor (Cint) having a charging electrode coupled to photocurrent processing circuitry,
wherein said ROIC provides linear operation over a linear pixel output signal range when a voltage across said Cint ($V_{int}$) is in a $V_{int}$ range between a first voltage $V_{lin1-cap}$ and a second voltage $V_{lin2-cap}$, and a non-linear operation range outside said Vint range;
applying a reset voltage (Vrst) to said charging electrode to reset said Vint outside said $V_{int}$ range;
integrating said photocurrent to generate integrated photocurrent during a frame including integrating from said Vrst toward said $V_{int}$ range to integrate at least a portion of background current into said non-linear operation range and continuing said integrating to reach a voltage within said $V_{int}$ range to integrate scene current into said linear pixel output signal range, and
processing said integrated photocurrent to generate a pixel output signal, wherein said pixel output signal excludes at least some of said portion of said background current integrated into said non-linear operation range.

2. The method of claim 1, wherein said Vrst comprises ground for said ROIC or a DC level.

3. The method of claim 1, further comprising measuring or simulating a transfer function for said ROIC that relates said pixel output signal voltage to integrated charge received from said photodetector, and obtaining said $V_{int}$ range from said transfer function.

4. The method of claim 1, wherein said Cint comprises a capacitor-connected metal oxide semiconductor field effect transistor (MOSFET), a conventional parallel-plate capacitor or a combination of the above.

5. The method of claim 1, wherein said processing further comprises digitizing so that said pixel output signal is a digital pixel output signal comprising a plurality of bits that have a corresponding count, wherein a zero count is set to correspond to a background flux level associated with said background current.

6. The method of claim 1, wherein said pixel output signal comprises an analog pixel output signal.

7. The method of claim 1, wherein said applying said Vrst comprises a user of said ROIC programming said Vrst.

8. A Read Out Integrated Circuit (ROIC), comprising:
an integration capacitor (Cint) having a charging electrode that charges responsive to photocurrent received from a photodetector, said charging electrode coupled to photocurrent processing circuitry comprising a unit cell amplifier coupled by a column bus to a column buffer that is coupled by an output bus to an output amplifier that provides a pixel output signal,
wherein said ROIC provides linear operation over a linear pixel output signal range when a voltage across said Cint ($V_{int}$) is in a $V_{int}$ range between a first voltage $V_{lin1-cap}$ and a second voltage $V_{lin2-cap}$, and a non-linear operation range outside said Vint range;
at least one reset voltage bias generator coupled through a switch to said charging electrode for applying a reset voltage (Vrst) to said charging electrode to reset said Vint outside said $V_{int}$ range so that said photocurrent processing circuitry integrates said photocurrent to generate integrated photocurrent during a frame including integrating from said Vrst toward said $V_{int}$ range to integrate at least a portion of background current into said non-linear operation range and continuing said integrating to reach a voltage within said $V_{int}$ range to integrate scene current into said linear pixel output signal range, and
wherein said photocurrent processing circuitry processes said integrated photocurrent to generate a pixel output signal, wherein said pixel output signal excludes at least some of said portion of said background current integrated into said non-linear operation range.

9. The ROIC of claim 8, wherein said at least one reset voltage bias generator comprises a first and a second reset voltage bias generator.

10. The ROIC of claim 8, wherein said reset voltage bias generator provides a user programmable bias level.

11. The ROIC of claim 8, wherein said Cint comprises a capacitor-connected metal oxide semiconductor field effect transistor (MOSFET), a conventional parallel-plate capacitor, or a combination of the above.

12. The ROIC of claim 8, wherein said photocurrent processing circuitry further comprises an analog to digital converter (ADC) for digitizing so that said pixel output signal is a digital pixel output signal.

13. The ROIC of claim 12, wherein said ADC is within said column buffer.

14. A monolithic imager chip, comprising:
a photodetector that generates photocurrent responsive to flux received from a scene, and a Read Out Integrated Circuit (ROIC) coupled on said chip to receive said photocurrent from said photodetector, said ROIC comprising:
an integration capacitor (Cint) having a charging electrode that charges responsive to said photocurrent, said charging electrode coupled to photocurrent processing circuitry comprising a unit cell amplifier coupled by a column bus to a column buffer that is coupled by an output bus to an output amplifier that provides a pixel output signal,
wherein said ROIC provides linear operation over a linear pixel output signal range when a voltage across said Cint ($V_{int}$) is in a $V_{int}$ range between a first voltage $V_{lin1\text{-}cap}$ and a second voltage $V_{lin2\text{-}cap}$, and a non-linear operation range outside said Vint range;
at least one reset voltage bias generator coupled through a switch to said charging electrode for applying a reset voltage (Vrst) to said charging electrode to reset said Vint outside said $V_{int}$ range so that said photocurrent processing circuitry integrates said photocurrent to generate integrated photocurrent during a frame including integrating from said Vrst toward said $V_{int}$ range to integrate at least a portion of background current into said non-linear operation range and continuing said integrating to reach a voltage in said $V_{int}$ range to integrate scene current into said linear pixel output signal range, and
wherein said photocurrent processing circuitry processes said integrated photocurrent to generate a pixel output signal, wherein said pixel output signal excludes at least some of said portion of said background current integrated into said non-linear operation range.

15. The monolithic imager chip of claim 14, wherein said Cint comprises a capacitor-connected metal oxide semiconductor field effect transistor (MOSFET), a conventional parallel-plate capacitor, or a combination of the above.

16. The monolithic imager chip of claim 14, wherein said reset voltage bias generator provides an adjustable bias level.

17. The monolithic imager chip of claim 14, wherein said to photocurrent processing circuitry further comprises an analog to digital converter (ADC) for digitizing so that said pixel output signal is a digital pixel output signal.

18. The monolithic imager chip of claim 17, wherein said ADC is within said column buffer.

19. The monolithic imager chip of claim 14, wherein said at least one reset voltage bias generator comprises a first and a second reset voltage bias generator.

20. The monolithic imager chip of claim 14, wherein said reset voltage bias generator provides a user programmable bias level.

* * * * *